United States Patent [19]

Colvin

[11] 3,836,253

[45] Sept. 17, 1974

[54] INTERNAL COMBUSTION ENGINE COOLANT SYSTEM LEAK DETECTION METHOD

[75] Inventor: Alex D. Colvin, Oak Park, Mich.

[73] Assignee: Ford Motor Company, Dearborn, Mich.

[22] Filed: Feb. 28, 1973

[21] Appl. No.: 336,593

[52] U.S. Cl.................... 356/70, 250/574, 356/208, 356/209
[51] Int. Cl...................... G01n 21/26, G01n 21/48
[58] Field of Search............ 356/70, 198, 201, 208, 356/209, 103; 250/301, 574

[56] References Cited
UNITED STATES PATENTS

| | | | |
|---|---|---|---|
| 2,203,720 | 6/1940 | Dale.................................. | 356/70 X |
| 3,586,862 | 6/1971 | Topol................................. | 356/208 |
| 3,714,444 | 1/1973 | Carr et al........................... | 356/208 |
| 3,734,629 | 5/1973 | Griffiths et al................... | 356/208 X |

OTHER PUBLICATIONS

Svelund, EEE, Vol. 19, No. 4, April 1971, Entry 411.
Svelund, EEE, November 1970, page 101.

*Primary Examiner*—John K. Corbin
*Assistant Examiner*—F. L. Evans
*Attorney, Agent, or Firm*—Robert A. Benziger; Keith L. Zerschling

[57] ABSTRACT

This invention involves an apparatus and method for measuring the light reflecting capability of the lubricant in the lubricating system of the internal combustion engine as a measure of the integrity of the coolant system of the engine. The method involves operating the engine with a substantially water-free lubricant such as oil for a period of time sufficient to permit contamination of the oil in the event a coolant system leak exists and thereafter measuring the light reflective ability of the oil with increased light reflective capability being indicative of a coolant system leak. By situating a light source and a light sensing means axially displaced one from the other on a slender probe, the probe may be inserted into the oil dip stick passage of the engine to a depth sufficient to submerge the light source and the light sensing means and rotation of the probe about its longitudinal axis will eliminate light reflection from internal engine structure from giving false reading. Suitable filtering of the light source will also reduce reflection induced reading. A suitable calibrated electrical readout system may provide a direct reading of the magnitude of a suspected coolant leak or a go-no go indication.

8 Claims, 3 Drawing Figures

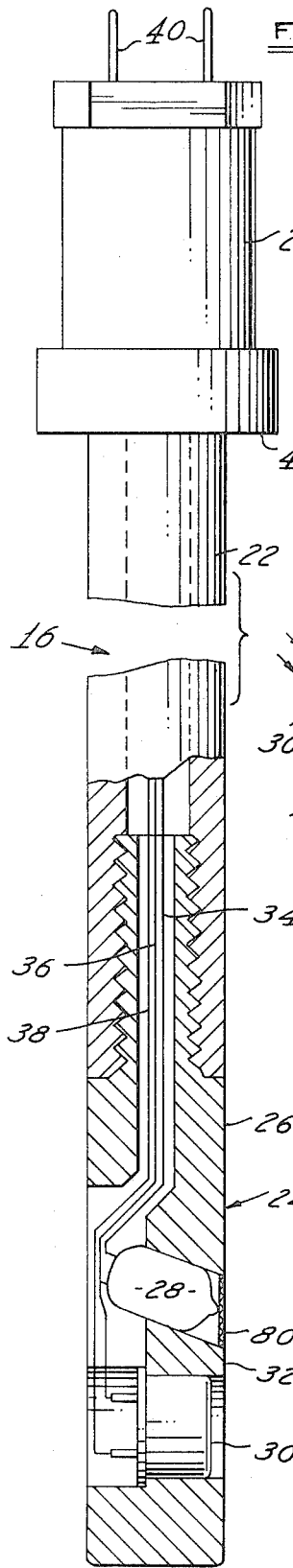
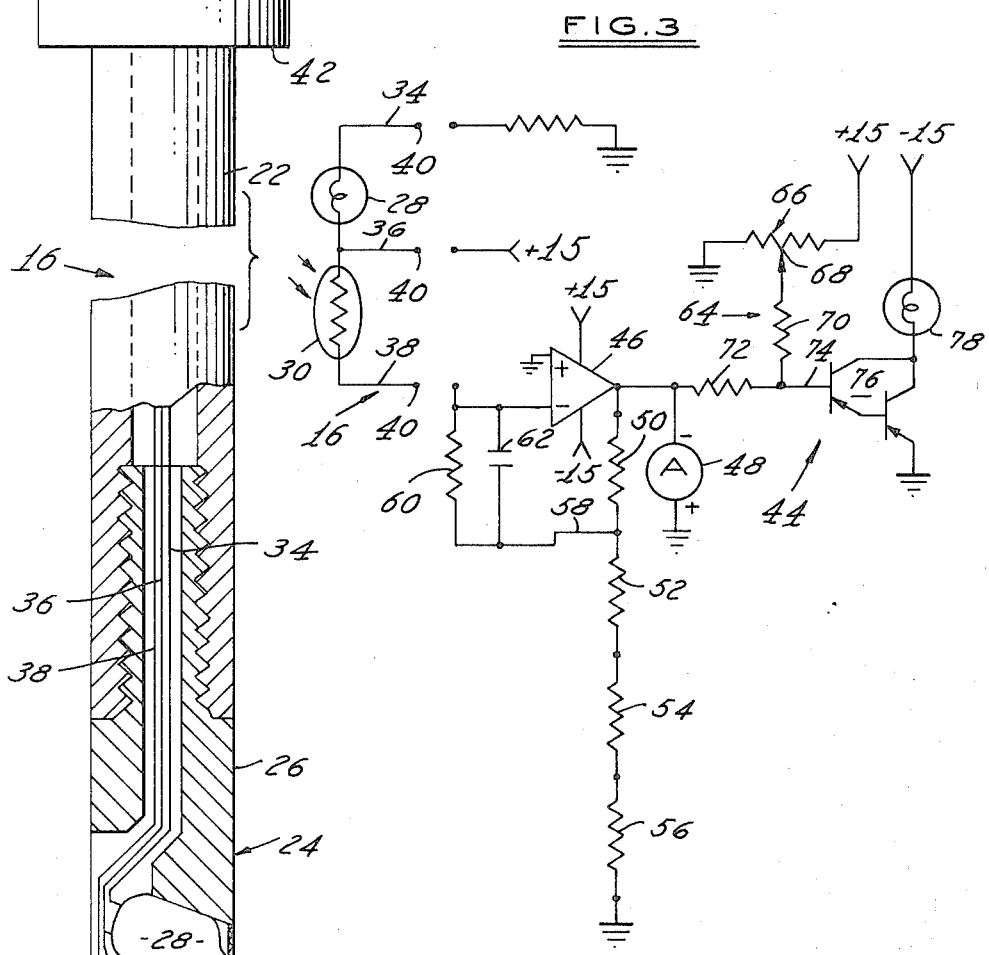
FIG. 2
FIG. 3

INTERNAL COMBUSTION ENGINE COOLANT SYSTEM LEAK DETECTION METHOD

BACKGROUND OF THE INVENTION

1. Field Of The Invention

The present invention is related to the field of internal combustion engine assembly test procedures and particularly to that portion of the above noted field which is concerned with the testing of the integrity of the coolant system of the internal combustion engine.

2. Description of the Prior Art

Heretofore the assembly of an internal combustion engine and its subsequent "running in" prior to installation in, for example, an automobile has involved the testing of the coolant system of the engine, in those cases where the engine is a water cooled internal combustion engine, by a more or less casual optical ("eye balling") examination of the color of the oil in the coolant system. This test has been conducted by withdrawing the oil lubricant level indicating dip stick from the engine after the engine has been operated for a relatively short period of time, for example, 10 minutes, and by optically comparing the color of the oil clinging to the dip stick with, for example, a color chart or by determining that a cloudiness or milkiness of the oil color exists. This technique of "eye balling" of the dip stick appearance is capable of detecting coolant system leaks in excess of approximately 50 cubic centimeters of water per minute in a run-in time period of about 10 minutes. The detection of slower leaks than this was purely a happenstance characteristic. However, leaks of smaller quantities of coolant are nevertheless considered deleterious to the engine and it is, therefore, an object of the present invention to provide a leak detecting apparatus and procedure by which coolant system leakage at rates significantly smaller than 50 cubic centimeters per minute may be detected. It is also a specific object of the present invention to provide a test procedure whose results are reliable and repeatable and do not depend upon the skill of the test personnel by giving a simple go-no go indication and avoiding any "eye balling".

It is well known that the presence of water in the lubricating system of an internal combustion engine may be detected by the presence of water floating on the surface of the engine lubricant or alternatively by a change in the light transmission capabilities of the oil. However, in order to determine the presence of water floating on the surface of the engine lubricant, a partial disassembly of the engine would be required to provide adequate viewing space for reliably determining the amount of water present while the measurement of the light transmission capabilities of the oil would require either a partial disassembly of the engine or a major redesign of the engine to provide for a pair of viewing excess apertures. Disassembly of an engine as part of a test procedure is considered to be highly undesirable inasmuch as it would greatly increase the time and cost of such a test procedure and the simple disassembly and subsequent reassembly of an internal combustion engine could itself be the source of coolant system leaks. It is, therefore, a further object of the present invention to provide a coolant system leak detection method and apparatus which does not require any disassembly of the internal combustion engine. It is also an object of the present invention to provide a coolant leak detection method which is fully compatible with existing engine design and technology.

As the emphasis for emission controls and test procedures increases, the cost of assembly of an internal combustion engine in terms of man hours of testing time will greatly increase. However, certain aspects of present and proposed test procedures for an engine merely involve operating the engine for a period of time which period of time is now conveniently used for carrying out the known coolant system leak detection procedure. It is, therefore, a further object of the present invention to provide a test procedure and apparatus for determining the integrity of the cooling system of an internal combustion engine which may advantageously be implemented while the engine is under operational conditions.

The known methods for testing an oil for its water content rely on the reduction in light transmitting capability of an oil which includes an insoluble substance in suspension. Such methods are not totally reliable when applied to small total concentrations of the insoluble whose presence is to be detected since the difference in light transmission capability would only be slight and hence difficult to accurately measure in conditions other than laboratory conditions. It is, therefore, a further object of the present invention to provide a method and apparatus which does not rely upon direct measurement of the light transmission capability of the lubricant. In the case of conventional (clean) motor oils, the light reflecting capability is very small and approaches zero for light which has entered the oil. A leak of only a few cubic centimeters of water per minute will therefore produce a change of internal reflectivity of at least an order of magnitude. It is, therefore, a specific object of the present invention to provide a method and apparatus for detecting and measuring engine coolant system leaks which measures the level of internal light reflection caused by the presence of water in the lubricant.

SUMMARY OF THE PRESENT INVENTION

The present invention contemplates the measuring of the reflectivity of the oil in the engine lubricating system and using this value as an indication of the integrity or lack of integrity of the engine coolant system. The method further contemplates the indirect measuring of the turbidity of the lubricant by measuring the quantity of light reflected from water droplets present in the oil as a result of coolant system leakage while the engine is running and has been running for a brief period of time sufficient to permit a degree of leakage to occur and to permit the lubricant to reach its normal operating temperature. The present invention contemplates the provision of a relatively long and slender probe having a light source and a light sensing device such as, for example, a miniature photocell with the light source and light sensing means being axially displaced one from the other along the length of the probe and optically masked one from the other. The probe diameter and length are preferably arranged so that the probe may be inserted into the normally provided lubricant level measuring passage or "dip stick guide" of the engine. In order to overcome the possibility of the light source and the light sensing means being positioned adjacent a structural portion of the engine when in the lubricating system, the present invention further contemplates rotation of the probe about its longitudinal axis until a minimum signal is produced by the light sensing means. Alternatively, the present invention contemplates providing the light source with a filter to result in light having a color which is greatly attenuated by the lubricant, for example, the color blue, to confine the active reflection area to that in the immediate vicinity of the probe.

In the case of a newly assembled internal combustion engine, the present invention contemplates providing the engine with a quantity of lubricant having a predetermined reflectivity, which will normally be very small, and otherwise enabling the engine to be operated on a test stand. This may require connection to a coolant source, independent sources of fuel and electrical energy and may also require motoring of the engine to insure that the engine is runable. In the case of an older engine having a suspected coolant system, the present invention contemplates a thorough flushing of the lubricant system of the engine and provision of a suitable lubricant having a known light reflecting capability.

BRIEF DESCRIPTION OF THE DRAWINGS

FIG. 2 is a partially broken away partial sectional view of the probe according to the present invention.

FIG. 3 is an electronic schematic diagram illustrating an electronic circuit for use with the probe of FIG. 2 in accomplishing the method of the present invention.

DETAILED DESCRIPTION OF THE PREFERRED EMBODIMENT

Figure 1:
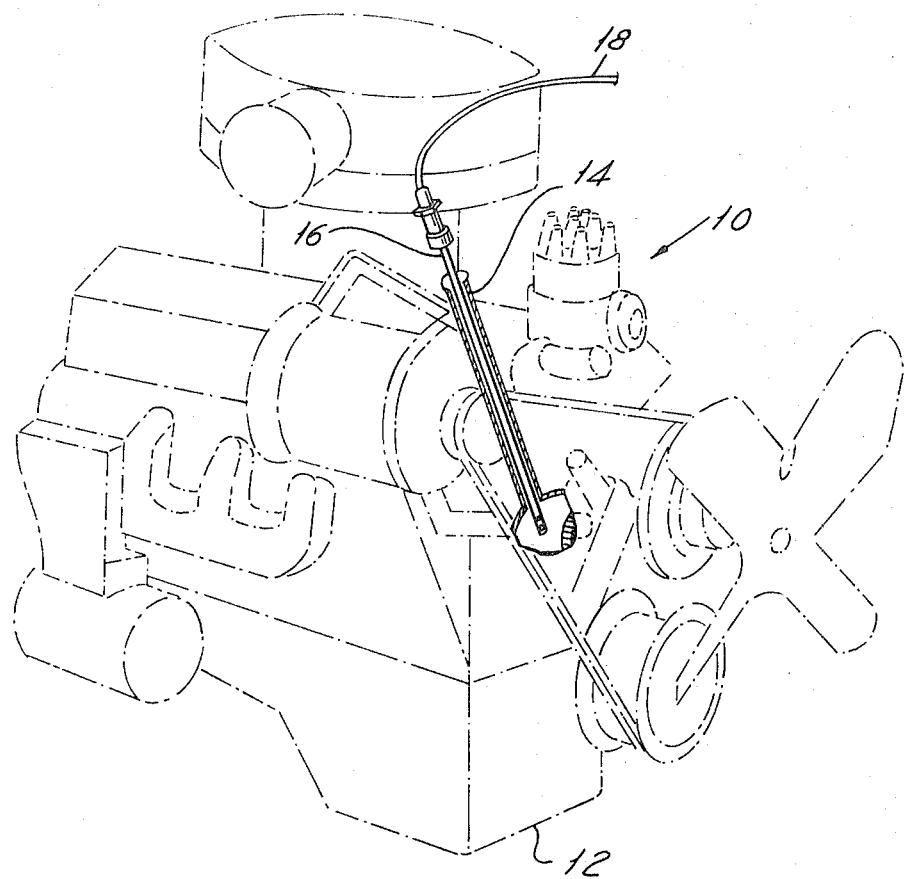
FIG. 1 illustrates in phantom lines a representative internal combustion engine having an oil dip stick guide in which the probe according to the present invention is to be inserted for performance of the method of the present invention.

Referring now to FIG. 1, a liquid cooled internal combustion engine, generally designated as 10, is shown in phantom lines. Such engines are normally provided with a pressurized oil lubricant system including an oil reservoir contained within pan 12 and with a mechanism for facilitating a periodic examination of the level of lubricant within the lubricant system. This examination is normally accomplished by use of an oil level dip stich which is insertable within the dip stick guide 14 (shown in a solid line sectional view). As this structure is generally well known and the use and operation is generally understood, further discussion is not deemed to be necessary. FIG. 1 also shows probe 16 extending into the interior of the engine 10 through oil dip stick guide 14. An electrical cable 18 communicates with one end of probe 16.

Referring now to FIGS. 1 and 2 and particularly to FIG. 2, the probe 16 is comprised of an electrical connector portion 20 arranged at one end of the rod or shaft 22 and having an electrically active coolant leak detecting portion 24 at the other end of the rod or shaft 22. The electrically active portion 24 includes a housing member 26, a light source 28 and a light sensing means 30. Additionally, wall portion 32 is situated intermediate light source 28 and light sensing means 30 to provide an optical mask or barrier therebetween so that light emitted from light source 28 will not directly strike or impinge upon the active portion of light sensor 30. A plurality, in this instance three, of conducting members or wires 34, 36 and 38 interconnect the electrical terminal portion 20 with the light source 28 and the light sensing means 30. Electrical connector portion 20 includes a plurality of terminal pine 40 for mating with a suitable receptical portion of cable 18. An abutment shoulder 42 is also provided to limit the depth of insertion of probe 16 into the dip stick guide 14.

With reference now to FIG. 3, the electrical circuit of the present invention is illustrated. As shown in FIG. 3, the probe 16 is represented by the light source 28 and the photocell 30 interconnected by the lead wires 34, 36 and 38. These wires are connected through the electrical terminal means 20 to an electrical cable 18 which communicates the light source 28 and the light measuring means 30 to a remote leak detection instrument. According to FIG. 3, the leak detection instrument indicated generally as 44 is comprised of differential amplifier 46 having an inverting input and a noninverting input arranged to receive the leak indicating signal from the light sensor 30 at the inverting input, the input which is designated by the minus sign. The amplifier noninverting input (designated by the plus sign) is grounded. The amplifier also receives the plus and minus supply voltages which are here illustrated as being +15 volts and −15 volts. The output of the amplifier 46 is communicated to ground through an ammeter 48 and is also communicated to ground through a multiple resistance network comprised of resistances 50, 52, 54 and 56. This resistor network comprises a variable gain switch whose effect is varied by moving switch contact member 58 from one junction to another. Movable switch member 58 is communicated to the feedback path comprised of the parallel combination of resistor 60 and capacitor 62. In the preferred configuration, resistor 60 is a relatively large magnitude resistance and this causes differential amplifier 46 to operate as a current amplifier.

FIG. 3 also illustrates a go-no go output signal network 64 communicating with the output of amplifier 42. This network is comprised of the variable threshold device 66 comprised of a potentiometer 68 and a pair of resistances 70, 72 interconnecting the potentiometer 68 with the output of differential amplifier 46. The junction of resistors 70, 72 is connected to the input or control electrode 74 of a switch 76 which in this case is shown as a Darlington connected pair of PNP transistors having a grounded emitter. The switch 76 is operative to control current flow through an indicator mechanism here illustrated as bulb 78 connected on one side to the common collector of the Darlington connected pair of transistors and connected on the other side to the minus supply voltage.

OPERATION

Referring now to FIGS. 1, 2 and 3, the method of the present invention and the operation of the circuit of FIG. 3 and the probe of FIG. 2 will be described. While the operational description is cast in terms of a test procedure following assembly of an engine, it will be understood that the test procedure is also applicable to periodic testing throughout the life of the engine.

Following final assembly of an engine 10, a supply of lubricant is provided to the engine and the engine is connected for operation. Most assembly operations normally provide connection of the engine to a test fixture which includes the necessary electrical, coolant and fuel connections for safe operation of the engine.

The engine is normally operated for a period of time on the order for about ten minutes during which time a series of checks and tests are to be performed on the engine to assure that the assembly procedure has been properly followed and to provide initial ignition and carburetion settings. Where one of the tests ordinarily performed involved looking at the color of the oil clinging to the dip stick upon extraction of the dip stick from the lubricant reservoir, the present invention contemplates, in place of the "eye balling", the insertion of probe 16 into the lubricant level indicating passage or guide 14 to a depth sufficient to submerge both the light source 28 and the light sensing means 30 below the surface of the oil. Energization of light sensing means 28 while submerged in the lubricant will result in light entering the lubricant within the engine and, assuming the presence of coolant leaking from the cooling system of the engine, will result in reflection of greater or lesser amounts of light from the fluid in the reservoir to the light sensing means 30. As illustrated, light source 28 may be any convenient small lamp bulb such as, for example, General Electric bulb No. 715. Light sensing means 30 may be any convenient photo sensor such as a photo resistor or a photo diode. As illustrated, light sensor 30 comprises a photo resistor such as, for example, Clairex number 905 HLT. In the case of a photo resistor, the resistance of the device is inversely proportional to the amount of light entering the device. Thus, for greater amounts of coolant within the lubricant system, a larger light reflection will result and the amount of current flow through the photo resistor 30 will increase. This current flow will enter the inverting input of the operational amplifier 46 which may be, for example, Fairchild Semiconductor Devices operational amplifier number 741. Depending upon the gain setting established in the feedback circuit of the operational amplifier, the current gain of the operational amplifier may be readily adjusted.

Since the magnitude of the current flowing through the light sensing means 30 and into the inverting input of the amplifier 46 will be directly proportional to the quantity of light reflected by coolant which has leaked into the lubricant reservoir of the engine, the quantity of current flowing out of the amplifier 46 will be directly proportional to this value multiplied by the gain setting of the feedback circuit. In the case of an accurate measure of the leakage being desired, the passing of this current through a suitably calibrated ammeter will result in a direct readout of the quantity of coolant which has leaked into the lubricant reservoir.

In order to provide an instrument for use on the assembly line, it is not considered to be necessary that direct measurement be made of any existing leaks but rather that leakage into the lubricant system of the engine be below a predetermined value. The present invention, therefore, contemplates the provision of go-no go output electronics in association with the circuit thus described which will operate to light bulb 78 in the event that the quantity of light reflected by the coolant in the lubricant system to light sensing means 30 exceeds a predetermined value.

Since the internal structure of engines in the vicinity of the oil dip stick passage may vary from engine design to engine design depending upon placement of the oil dip stick passage, it is further contemplated that the method of the present invention will include the step of rotating the probe 16 about its longitudinal axis so that the light source 28 will direct light outward from probe 16 through an arc so that a position of minimum light reflection may be located. For example, a structural boss or element may appear in the vicinity of the oil dip stick passage and the insertion of probe 16 may result in light reflection off to this structural member simulating the reflection produced by a large coolant leak. By rotating probe 16 about its longitudinal axis, the light source 28 and the light sensing means 30 may be directed away from any structural members and the quantity of light subsequently reflected will give a more accurate reading of the coolant leakage. This minimum light reflection condition can be determined, for example, by observing a minimum meter reading of the calibrated ammeter 48 or by observing extinguishment of bulb 78 either of which indicate the optimum probe rotation position.

The conventional engine lubricants are known to attenuate light in certain color regions, for example blue. By providing a blue filter 80 in conjunction with light source 28, or alternatively by using a selected monochromatic light source, the reflection effect can be limited to the immediate vicinity of the light source and error signals caused by more remotely located engine structure can be avoided. Rotation or single position insertion could still be used to avoid reflections from closely adjacent engine structure.

While the electric circuit of the leak detecting instrument of the present invention has been illustrated with reference to stated electrical components and has been illustrated with reference to a selected level of energization, the man of skill in the electrical art will recognize that other circuit arrangements, other components and other energization voltage values may be readily applied to produce an electrical circuit consonant with the objective of the instant invention.

I claim:

1. A method of determining the integrity of the cooling system of a liquid cooled internal combustion engine comprising:
   placing the engine in an operational condition;
   submerging a light source in the lubricant reservoir of the engine;
   submerging a light sensing means in the lubricant reservoir of the engine, said light source and said light sensing means being mutually optically masked; and
   measuring the turbidity of the lubricant.

2. The method of claim 1 wherein said light source and said light sensing means are arranged on a common probe facing generally in the same direction with a light impervious portion situated between the light source and the light measuring means and the steps of submerging are performed substantially simultaneously.

3. The method of claim 2 wherein the steps of submerging comprise:
   removing the lubricant level indicator and inserting the probe in the lubricant level indicator passage to a depth sufficient to submerge both the light source and the light sensing means.

4. The method of claim 3 including the step of rotating the probe.

5. A method of determining the integrity of the cooling system of a liquid cooled internal combustion engine comprising:

providing the engine with a substantially water-free lubricant having a known light reflecting capability;

placing the engine in an operational condition;

submerging a light source and a light sensing means in the lubricant, said light source and said light sensing means being mutually optically masked;

measuring the quantity of light reflected from the lubricant to the light sensing means; and determining the difference between the measured light reflected and the normal reflection for the lubricant provided.

6. The method of claim 5 wherein the step of determining the difference comprises the steps of comparing electronically an electrical signal valve indicative of the quantity of reflected light; and actuating a signalling mechanism whenever the electrical signal indicates a level of reflected light substantially in excess of the known light reflecting capability of the lubricant whereby the presence of coolant leaking from the coolant system of the engine into the lubricating system of the engine may be detected.

7. The method of claim 5 including the step of rotating the light source and light sensing means about an axis; and determining the minimum difference between the measured light reflected and the normal reflection for the lubricant provided whereby reflections from interior surfaces of the engine may be avoided.

8. The method of claim 5 wherein the step of submerging comprises the steps of removing the lubricant level indicator; and inserting a probe which includes the light source and the light system means into the lubricant level indicator passage to a depth sufficient to submerge both the light source and the light system means.

* * * * *